Aug. 11, 1964

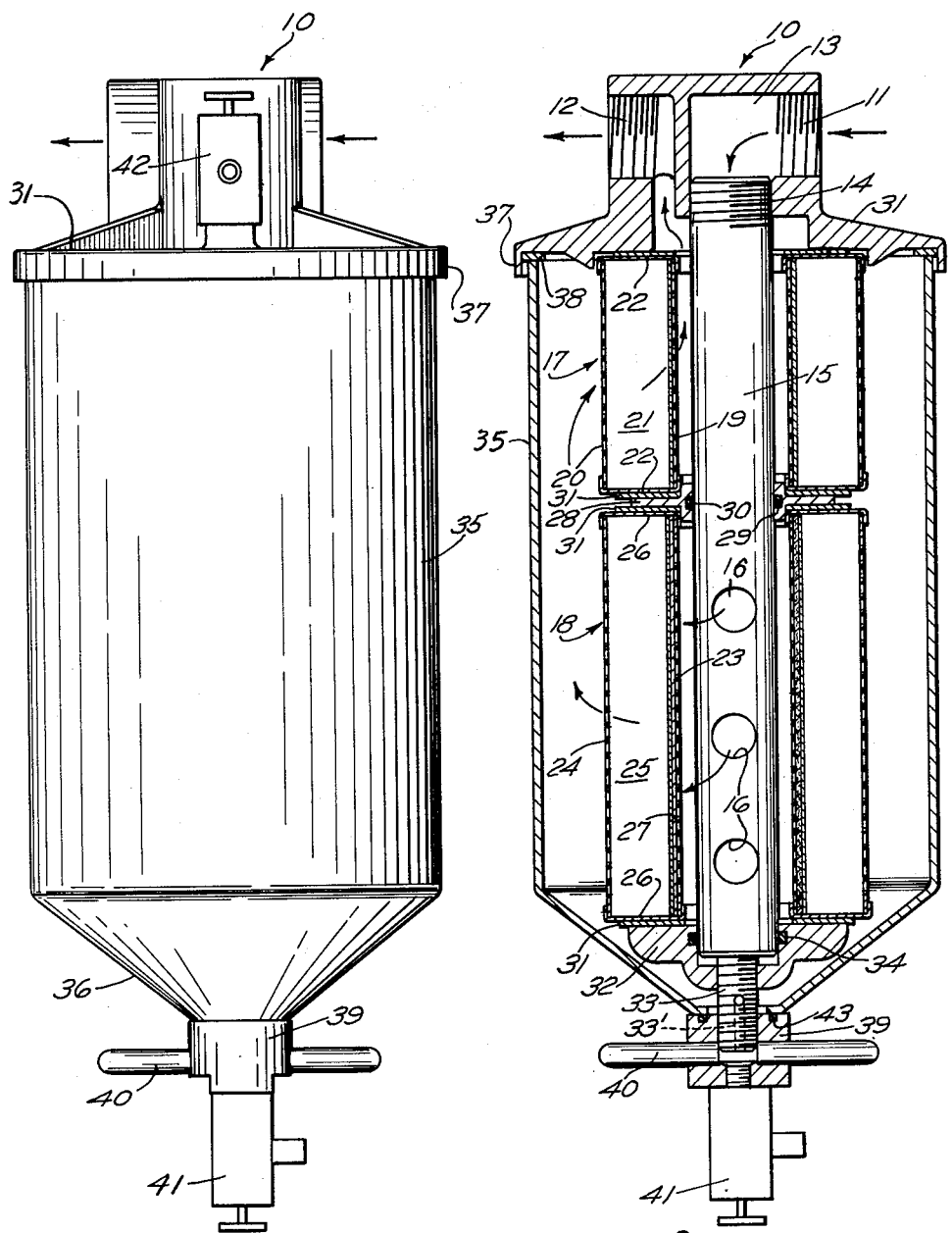

C. OLMOS 3,144,407

SEPARATOR FOR IMMISCIBLE FLUIDS

Filed July 10, 1961

INVENTOR.
CESAR OLMOS
BY *Charles C. Willson*
ATTORNEY

United States Patent Office 3,144,407
Patented Aug. 11, 1964

3,144,407
SEPARATOR FOR IMMISCIBLE FLUIDS
Cesar Olmos, Tulsa, Okla., assignor to Fram Corporation, Providence, R.I., a corporation of Rhode Island
Filed July 10, 1961, Ser. No. 122,749
2 Claims. (Cl. 210—307)

This invention relates to apparatus developed primarily to filter and separate immiscible liquids such as entrained water carried by gasoline, kerosene, diesel oil and other hydrocarbon liquids. The apparatus can also be used to remove solid contaminants and entrained water or other liquids from air or natural gas.

The present filter-separator is of simple and compact construction and is easy to service. It comprises a head or casting having a fluid inlet and outlet, and a cup-shaped body or shell that is removably secured to the head. Attached to the head is a center pipe on which are removably mounted one or more separator cartridges and coalescer cartridges. The cartridges are removably supported by the center pipe, and the shell is removably secured to the head by this pipe. As a result the shell is easy to remove when the cartridges are to be serviced, without disturbing the inlet and outlet pipe connection to the head.

This filter-separator was designed primarily for vertical installation with the head firmly secured in place, and the shell and cartridges removably supported by the head. However, the filter-separator can be used for horizontal installation.

The separator cartridge and coalescer cartridge surround the center pipe and this pipe delivers the liquid to be filtered and separated to the coalescer cartridge to flow through the cartridge in the inside-out direction. This permits the liquid to spread laterally and slow down in flow as it passes through the cartridge, to thereby improve the coalescing action on the water particles.

The function of the separator cartridge, which is preferably positioned above the coalescer cartridge, is to pass the hydrocarbon liquid or gas but block the coalesced water particles. These heavier water particles will move downwardly in the shell under the influence of gravity to the lower end of the shell where they can be removed through a valve.

The above and other features of the present invention will be further understood from the following description when read in connection with the accompanying drawings; wherein FIG. 1 is a side elevation of the filter-separator of the present invention.

FIG. 2 is a vertical sectional view of FIG. 1.

Figure 3:
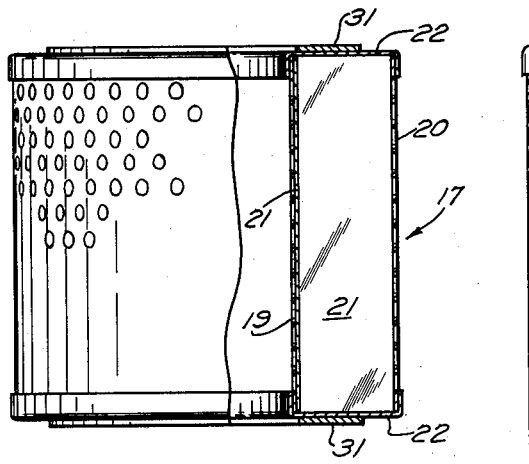
FIG. 3 is a side view with parts in section of the separator cartridge.
Figure 4:
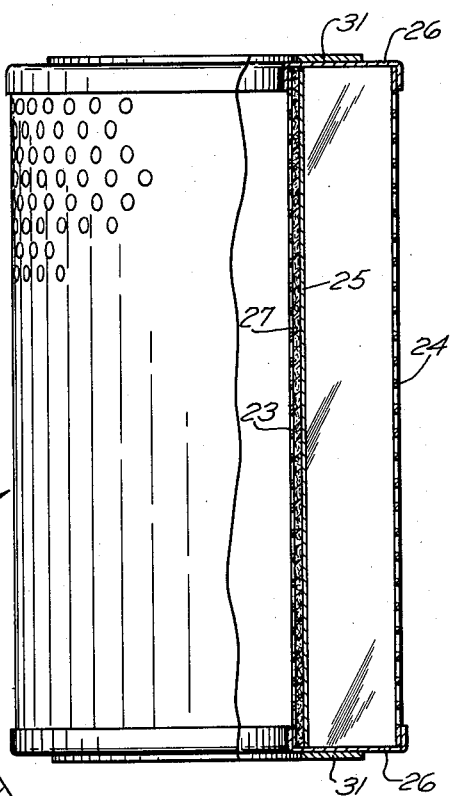
FIG. 4 is a side view with parts in section of the coalescer cartridge.

Referring to the drawings, 10 designates a metal head or casting having the threaded inlet passage 11 and threaded outlet openings 12 to which pipes, not shown, are connected. The inlet 11 leads to the central passage 13 which has the threaded passage 14 adapted to receive the relatively long downwardly extending center pipe 15. The head 10 is preferably bolted or otherwise rigidly secured to supporting structure, not shown.

The center pipe 15 is threaded at its upper end and this end is screwed tightly into the threaded portion 14 of the head 10. The lower half of the pipe 15 is shown as having the outlet holes 16. The construction is such that the liquid or gas to be filtered and freed of entrained water enters the head at 11 to pass downwardly in the pipe 15 to escape therefrom through the holes 16.

The center pipe 15 supports a separator cartridge 17 and coalescer cartridge 18 is their operating position one above the other in axial alignment, and it will be noted that the coalescer cartridge is disposed below the separator cartridge. If a relatively long separator is desired, then more than one of either the separator cartridge or coalescer cartridge may be mounted on the pipe 15. The construction and materials used in each cartridge will vary somewhat depending upon the type of fluid to be treated.

As above stated, the filter-separator of the present invention was developed primarily to treat hydrocarbon liquid to free the same from dirt and entrained water, and the cartridges now to be described are well adapted for this use.

The upper or separator cartridge 17 has a perforated inner annular wall 19 and a perforated outer annular wall 20 formed of sheet metal.

The space between these two walls is occupied by a cylinder 21 formed of pleated paper. This is a porous paper treated with phenol formaldehyde or similar resin to stiffen the paper and prevent it from becoming limp in the presence of water. This paper is also treated with a silicone or the like to make it water repellent. To each end of the pleated cylinder 21 is adhesively secured a metal end cap 22, and these caps have the inner and outer annular flanges shown to embrace the metal walls 19 and 20 as shown.

Figure 5:
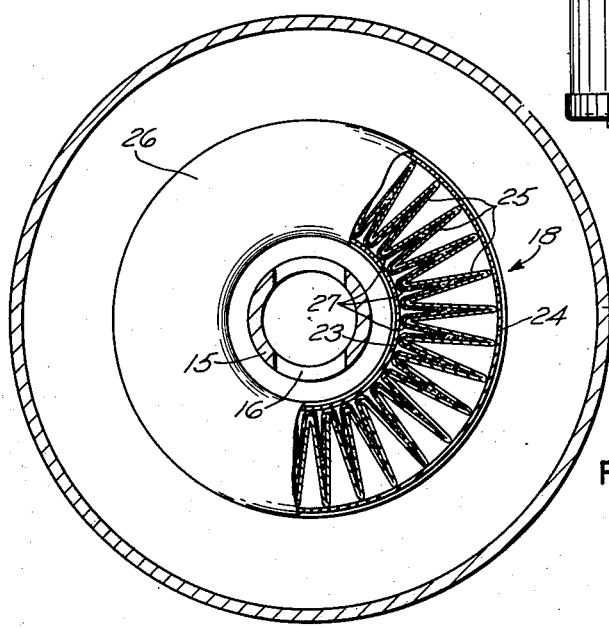
FIG. 5 is a transverse sectional view through the shell and coalescer cartridge.

Below the separator cartridge 17 is disposed the longer coalescer cartridge 18 having the perforated metal inner and outer cylindrical walls 23 and 24. Within the space between these two walls is placed the annular pleated paper filter element 25, and to each end of this filter element is adhesively secured a metal end cap 26 like the caps 22. In order to improve the coalescing properties of the pleated element 25, a soft batt formed of glass fibers is tucked in between the paper pleats at the inner face of the pleated element as indicated by 27, see FIG. 5.

Figure 6:
FIG. 6 is a sectional view through the circular casting disposed between the separator and coalescer cartridge.

When the cartridges 17 and 18 are mounted on the center pipe 15 their ends are spaced apart by the circular casting 28, best shown in FIG. 6. This casting helps to center the two cartridges on the pipe 15 and has the annular recess 29 adapted to receive the O-ring 30 that sealingly embraces this pipe and prevents flow upwardly in the annular area between the pipe 15 and the cartridges 17 and 18. Annular sealing gaskets 31 are provided at each end of each cartridge as shown.

The cartridges 17 and 18 are removably secured in the operating position in which they are shown by a cartridge clamping nut 32 that threadedly engages a threaded post 33 that is rigidly secured to the lower end of the center pipe 15. This post 33 is provided with a drilled passage 33′ to permit drainage of the coalesced water. This nut 32 has an O-ring 34 that sealingly engages the pipe 15. When this cartridge clamping nut is screwed home it provides sufficient pressure on the gaskets 31 to form a tight seal at each end of each cartridge.

The center pipe 15 and cartridges 17 and 18 are housed in the removable cup-shaped shell 35 having the closed lower end 36, and this lower end has a central opening through which the threaded post 33 projects. The head 10 has a shell receiving seat shown that is surrounded by the annular flange 37 adapted to enclose the upper end of the shell 35, and this seat is provided with the annular gasket 38. The shell 35 is tightly secured in the operating position in which it is shown by a shell lock-up nut 39 having the projecting wings 40 for hand rotation of this nut. The lock-up nut 39 is provided with an annular recess 43 adapted to receive an O-ring to seal the opening at the lower end of the shell 35.

It will be apparent from the foregoing that the present filter-separator is easy to service when the cartridges need attention. All that is necessary is to unscrew the nut 39 and drop the shell 35, then unscrew the cartridge clamping nut 32 and remove the cartridges.

In operation the liquid or gas to be cleaned and freed of water or other entrained liquid, enters the head 10 at 11 as indicated by the arrows to pass downwardly in the center pipe 15 and out through the holes 16 below the sealing gasket 30 of the casting 28. It then passes outwardly through the coalescer cartridge 18 as indicated by the arrows, and while passing through the glass fibers 27 and porous paper 25 the entrained water is coalesced into larger droplets. Some of these droplets will move downwardly along the perforated outer wall 24, and others may be carried by the hydrocarbon liquid upwardly to the separator cartridge 17 as indicated by the arrows, where the water particles will be blocked by the water repellent pleated paper 21. The hydrocarbon liquid will pass through such paper and up in the passage around the pipe 15 to pass out through the outlet 12.

The operation of the coalescer 18 may be improved by placing a knitted cotton sock, not shown, around the metal wall 24 to increase the size of the droplets. The water that accumulates in the lower portion of the shell 35 may be removed by opening the valve 41. When the separator is being placed in operation the valve 42 in the head may be opened to allow air trapped in the device to escape. If the device shown is installed in a horizontal position, then a valve, not shown, is needed at the lower wall to remove the accumulated water.

This device is preferably relatively small having an overall length of one foot or less in some cases. It is well adapted for use on trucks to clean the fuel and remove water therefrom. It can also be used to clean air for air pressure tanks and air for spray guns, and the air supply for various instruments.

Having thus described by invention, what I claim and desire to protect by Letters Patent is:

1. A separator for immiscible liquids, one of which is heavier than the other, comprising a head having an inlet for the mixed liquids and an outlet for the lighter of the two liquids, a shell adapted to be supported by the head in a downwardly extending position and having an upper end portion that sealingly engages the head and a closed lower end, a center pipe secured to the head in communication with said inlet and extending centrally downwardly from the head, a coalescer cartridge and a separator cartridge mounted on the pipe in axial alignment with the separator cartridge above the coalescer cartridge, a sealing gasket on the pipe between the two cartridges and said pipe having an opening leading to the interior of the coalescer cartridge so that the mixed liquids are delivered by the pipe to the coalescer cartridge to pass outwardly therethrough and then to the outer surface of the separator cartridge to pass inwardly through this cartridge to surround the pipe and flow along the pipe to said outlet, means for clamping these cartridges on the pipe so that they are supported by the head independently of the shell, threaded means at the outer end of the pipe for removably clamping the shell to the head, and an outlet for draining the separated heavier liquid from the shell.

2. A separator for immiscible fluids, one of which is heavier than the other, comprising a head having an inlet for the mixed fluids and an outlet for the lighter of the two fluids, a shell adapted to be supported by the head in a downwardly extending position and having an upper end portion that sealingly engages the head and a closed lower end, a center pipe secured to the head in communication with said inlet and extending centrally downwardly from the head, a coalescer cartridge and a separator cartridge mounted on the pipe in axial alignment with the separator cartridge above the coalescer cartridge, a sealing gasket on the pipe between the two cartridges and said pipe having an opening leading to the interior of the coalescer cartridge so that the mixed fluids are delivered by the pipe to the coalescer cartridge to pass outwardly therethrough and then to the outer surface of the separator cartridge to pass inwardly through this cartridge to surround the pipe and flow along the pipe to said outlet, means for clamping these cartridges on the pipe so that they are supported by the head independently of the shell, means for removably securing the shell to the head, and an outlet for draining the separated heavier fluid from the shell.

References Cited in the file of this patent

UNITED STATES PATENTS

| | | |
|---|---|---|
| 2,739,713 | Robinson | Mar. 27, 1956 |
| 2,757,803 | Robinson et al. | Aug. 7, 1956 |
| 2,864,505 | Kasten | Dec. 16, 1958 |
| 2,933,192 | Gretzinger | Apr. 19, 1960 |

FOREIGN PATENTS

| | | |
|---|---|---|
| 1,103,138 | France | May 18, 1955 |